US006475584B1

(12) United States Patent
Tsuchiya et al.

(10) Patent No.: US 6,475,584 B1
(45) Date of Patent: Nov. 5, 2002

(54) SEMI-CONDUCTIVE ROLL WHOSE OUTERMOST LAYER IS FORMED BY USING FLUORINE-MODIFIED ACRYLATE RESIN AS BASE RESIN MATERIAL

(75) Inventors: Kenichi Tsuchiya; Hiroki Sugiura, both of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/504,559

(22) Filed: Feb. 15, 2000

Related U.S. Application Data

(63) Continuation of application No. 09/034,753, filed on Mar. 4, 1998, now Pat. No. 6,090,792.

(30) Foreign Application Priority Data

Mar. 25, 1997 (JP) ............................................. 9-71228

(51) Int. Cl.[7] ........................... B32B 1/08; B32B 27/08; B32B 27/30; G03G 15/02

(52) U.S. Cl. .................... 428/36.91; 428/421; 428/422; 428/522; 428/906; 399/176; 492/52

(58) Field of Search ............................ 428/35.9, 36.91, 428/421, 422, 522, 906; 492/53; 399/176

(56) References Cited

U.S. PATENT DOCUMENTS

| | | | | | |
|---|---|---|---|---|---|
| 5,118,579 | A | * | 6/1992 | Aharoni et al. | 428/422 |
| 5,312,662 | A | * | 5/1994 | Ohta et al. | 428/36.8 |
| 5,322,899 | A | * | 6/1994 | Grunewalder et al. | 525/199 |
| 5,475,473 | A | * | 12/1995 | Masuda et al. | 399/168 |
| 5,572,304 | A | * | 11/1996 | Seto et al. | 399/313 |
| 5,761,581 | A | * | 6/1998 | Nojima | 399/174 |
| 5,786,091 | A | * | 7/1998 | Kurokawa et al. | 428/421 |
| 5,804,309 | A | * | 9/1998 | Itoh et al. | 428/375 |
| 6,090,492 | A | * | 7/2000 | Tsuchiya et al. | 428/421 |

FOREIGN PATENT DOCUMENTS

| | | | |
|---|---|---|---|
| EP | 0 606 907 A1 | * | 7/1994 |
| EP | 0 678 793 A2 | * | 10/1995 |
| JP | 7-42728 | * | 2/1995 |
| JP | 7-228820 | * | 8/1995 |

* cited by examiner

*Primary Examiner*—Paul Thibodeau
*Assistant Examiner*—Ramsey Zacharia
(74) *Attorney, Agent, or Firm*—Burr & Brown

(57) ABSTRACT

An electrically semi-conductive roll including a center shaft and a plurality of layers formed radially outwardly of the center shaft, wherein an outermost layer of the plurality of layers which is held in rolling contact with an outer circumferential surface of a photosensitive drum is formed by using a resin composition which contains as a base resin material a fluorine-modified acrylate resin.

17 Claims, 1 Drawing Sheet

SEMI-CONDUCTIVE ROLL WHOSE OUTERMOST LAYER IS FORMED BY USING FLUORINE-MODIFIED ACRYLATE RESIN AS BASE RESIN MATERIAL

This is a continuation application of application Ser. No. 09/034,753, filed Mar. 4, 1998, now U.S. Pat. No. 6,090,492, the entirety of which is incorporated herein by reference.

BACKGROUND OF THE INVENTION

1. Field of the Invention

The present invention relates to a semi-conductive roll which is suitably used as a charging roll, for example, in an image forming apparatus such as an electrophotographic copying machine, printer or the like.

2. Discussion of the Related Art

A semi-conductive roll such as a charging roll or a developing roll is installed in an image forming apparatus such as an electrophotographic copying machine, printer or the like, such that the semi-conductive roll is held in rolling contact with a photosensitive drum. For instance, the charging roll is used in a roll charging method wherein a photosensitive drum on which an electrostatic latent image is formed is charged by the charging roll. Described more specifically, in the roll charging method, the charging roll and the photosensitive drum are rotated such that the charging roll to which a voltage is applied is held in pressing contact with an outer circumferential surface of the photosensitive drum, to thereby charge the outer circumferential surface of the photosensitive drum. The developing roll carries a toner on its outer circumferential surface. The photosensitive drum and the developing roll are rotated such that the developing roll is held in pressing contact with the outer circumferential surface of the photosensitive drum on which the latent image is formed, so that the toner is transferred from the developing roll onto the photosensitive drum, whereby the latent image is developed into a visible image.

Since the charging roll and the developing rolls as described above are held in rotating contact with the outer circumferential surface of the photosensitive drum, such rolls are required to exhibit low hardness or high flexibility, and a moderate degree of electrical conductivity for charging the photosensitive drum.

In recent years, there is an increasing demand for higher image reproducing capability and excellent energy-saving characteristic of the image forming apparatus, as well as higher process speed and excellent durability of the image forming apparatus. In an attempt to improve the energy-saving characteristic for reducing the electric power to be consumed by the image forming apparatus, the melting point of the toner is lowered for the purpose of fixing the toner on a recording medium at a lower temperature. Further, for improving the performance of the image forming apparatus to provide sufficiently high image quality, the size of the toner particles is made smaller.

However, when the melting point of the toner is lowered or the size of the toner particles is made smaller, the toner undesirably tends to adhere to the semi-conductive roll such as the charging roll and the developing roll as described above which are inevitably heated in the image forming apparatus during the operation of the apparatus. The toner which adheres or clings to the semi-conductive roll causes deterioration of the image reproducing capability of the image forming apparatus. Described more specifically, with an increase in the number of copying or printing operations, in other words, with an increase in the number of operations to develop the electrostatic latent images into visible toner images on the outer circumferential surface of the photosensitive drum, the electric resistance of the semi-conductive roll such as the charging roll tends to be raised as a whole due to the adhesion of the toner to the semi-conductive roll. Further, uneven adhesion of the toner to local portions of the roll causes a variation in the resistance of the roll at the local portions. As a result, the image to be reproduced by the image forming apparatus is undesirably deteriorated.

As one measure for preventing the deterioration of the copying or printing quality, it is effective to prevent the toner from adhering to the surface of the semi-conductive roll such as the charging roll. However, a conventional roll whose outermost layer is formed of a hydrophilic resin such as N-methoxymethylated nylon suffers from variation of the electric resistance under the operation at high temperature and high humidity. In addition, the conventional roll is not capable of effectively preventing the adhesion of the toner to its surface. In place of such a nylon resin, a fluoro resin is used for forming the outermost layer of the roll since the fluoro resin permits relatively easy removal of the outermost layer from a mold used for forming the roll. However, the adhesion of the toner to the roll surface is not prevented to a satisfactory extent even in the roll whose outermost layer is formed of the fluoro resin as described above. Namely, with the increase in the number of copying or printing operations, the toner is likely to adhere to the roll surface. Thus, the conventional semi-conductive rolls do not exhibit sufficiently high durability.

SUMMARY OF THE INVENTION

It is therefore an object-of the present invention to provide an electrically semi-conductive roll which does not suffer from a variation of the electric resistance due to a change of the operating environment and adhesion of the toner to its surface, so as to avoid deterioration of the image to be reproduced and assure improved durability of an apparatus which includes the semi-conductive roll.

The above object may be attained according to a principle of the present invention which provides an electrically semi-conductive roll including a center shaft and a plurality of layers formed radially outwardly of the center shaft, wherein an outermost layer of the plurality of layers which is held in rolling contact with an outer circumferential surface of a photosensitive drum is formed by using a resin composition which contains as a base resin material a fluorine-modified acrylate resin.

In a first preferred form of the present invention, the resin composition further contains as the base resin material at least one of a fluorinated olefin resin and a fluorine-unmodified acrylate resin.

In a second preferred form of the present invention, the fluorine-unmodified acrylate resin has a plurality of hydroxyl groups, and the fluorine-unmodified acrylate resin is crosslinked by a crosslinking agent which reacts with the plurality of hydroxyl groups of the fluorine-unmodified acrylate resin.

In one preferred arrangement of the above second form of the present invention, the crosslinking agent is a polyisocyanate compound.

In a third preferred form of the present invention, the plurality of layers include an electrically conductive and soft base layer which is located radially outwardly of the center shaft and formed of an elastic body or a foamed body, a resistance-adjusting layer which is located radially outwardly of the electrically conductive and soft base layer, and a protective layer which is located radially outwardly of the resistance-adjusting layer and which functions as the outermost layer.

In one preferred arrangement of the above third preferred form of the invention, the semi-conductive roll further includes a softener-preventive layer which is located between the electrically conductive and soft base layer and the resistance-adjusting layer.

In a fourth preferred form of the present invention, the outermost layer has a volume resistivity of $10^6$–$10^{15}$ Ω·cm.

In the semi-conductive roll constructed according to the present invention, owing to the hydrophilic property of the fluorine-modified component of the fluorine-modified acrylate resin included as the base resin material in the resin composition for providing the outermost layer of the roll, the variation of the electric resistance of the roll which may be caused by the change of the operating environment is effectively reduced. In addition, the fluorine-modified component is effective to prevent various stains from adhering to the surface of the outermost layer, whereby the present roll does not suffer from adhesion of the toner to its surface. The fluorinated olefin resin which is used in combination with the fluorine-modified acrylate resin as described above effectively prevents various stains deposited on the roll surface from permeating therethrough into the inside of the roll, so that the stains deposited on the roll surface can be easily wiped off. Accordingly, even if the toner adheres to the surface of the outermost layer, it is easily removed therefrom owing to the inclusion of the fluorinated olefin resin as the base resin material in the resin composition for forming the outermost layer, so that the roll surface can be kept clean. The fluorine-unmodified acrylate resin which is used in place of, or in combination with the above-described fluorinated olefin resin is effective to improve adhesiveness or adhesion of the outermost layer to the underlying layer of the roll structure, leading to a significantly improved durability of the semi-conductive roll.

According to the above-described second preferred form of the present invention, the fluorine-unmodified acrylate resin which effectively improves the adhesiveness of the outermost layer has a plurality of hydroxyl groups. The plurality of hydroxyl groups of the fluorine-unmodified acrylate resin reacts with a predetermined crosslinking agent so as to introduce effective cross-linked structure, resulting in improved adhesion between the outermost layer and the underlying layer of the roll structure on which the outermost layer is formed. This arrangement effectively prevents peeling or separation of the outermost layer from the roll structure. Since the outermost layer of the semi-conductive roll is repeatedly deformed during a long period of use of the roll, the outermost layer tends to locally peel off away from the roll structure, which results in separation or cracking of the outermost layer. However, the outermost layer of the semi-conductive roll according to the present invention is formed by the resin composition which contains as the base resin material the fluorine-unmodified acrylate resin in which the cross-linked structure is introduced, so that the peeling or cracking of the outermost layer is advantageously avoided. As a result, the semi-conductive roll of the present invention does not cause the deterioration of the image reproducing capability which may arise from the peeling or cracking of the outermost layer. As the crosslinking agent, the polyisocyanate compound is preferably used for effectively introducing the cross-linked structure in the polymer of the fluorine-unmodified acrylate resin.

According to the above-described third preferred form of the present invention, the plurality of layers include an electrically conductive and soft base layer which is located radially outwardly of the center shaft and formed of an elastic body or a foamed body, a resistance-adjusting layer which is located radially outwardly of the electrically conductive and soft base layer, and a protective layer which is located radially outwardly of the resistance-adjusting layer and which functions as the outermost layer. It is preferable to provide the softener-preventive layer between the electrically conductive and soft base layer and the resistance-adjusting layer for the purpose of preventing a softener such as oil from bleeding from the electrically conductive and soft base layer.

According to the above-described fourth preferred form of the present invention, the outermost layer has a volume resistivity of $10^6$–$10^{15}$ Ω·cm, so that the semi-conductive roll effectively functions as a charging roll.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which.

DETAILED DESCRIPTION OF THE PREFERRED EMBODIMENTS

Figure 1:
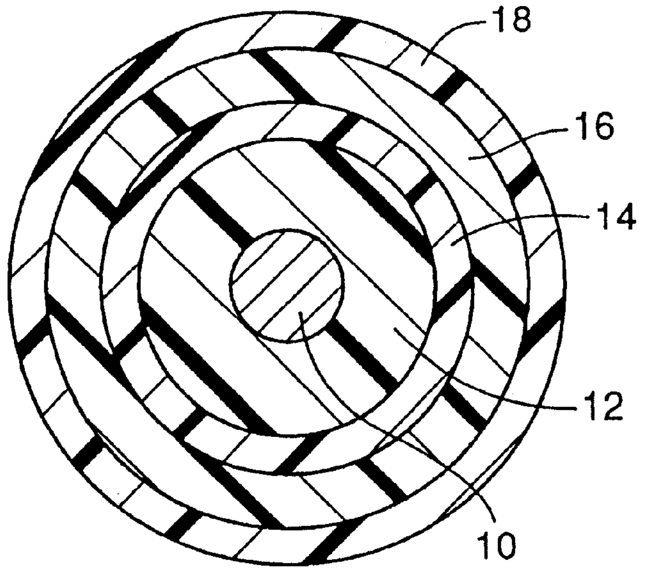
FIG. 1 is a transverse cross-sectional view of an electrically semi-conductive roll in the form of a charging roll constructed according to one embodiment of the present invention.
Figure 2:
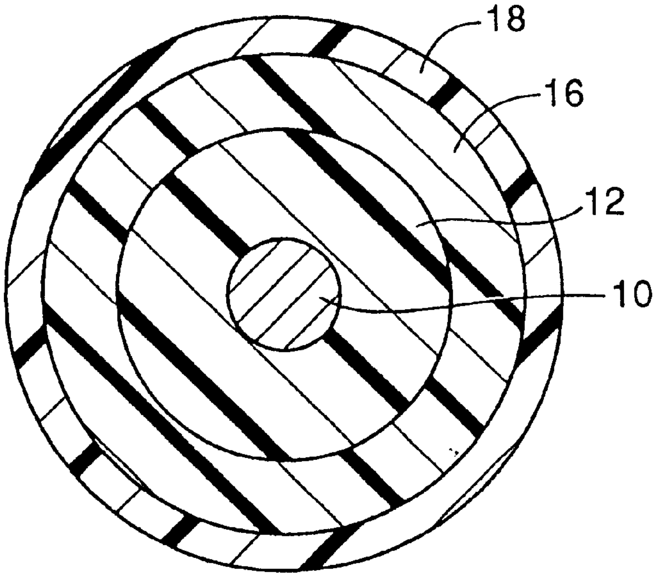
FIG. 2 is a transverse cross-sectional view of an electrically semi-conductive roll in the form of a charging roll constructed according to another embodiment of the invention.

Referring first to FIG. 1, there is shown an electrically semi-conductive roll in the form of a charging roll constructed according to one embodiment of the present invention. The charging roll of FIG. 1 includes an electrically conductive center shaft (metal core) 10. On the outer circumferential surface of the center shaft 10, there are laminated an electrically conductive and soft base layer 12 which is formed of an electrically conductive elastic body, a softener-preventive layer 14 and a resistance-adjusting layer 16 in the order of description in the radially outward direction of the roll. Each of the layers has a predetermined suitable thickness value. On the outer circumferential surface of the resistance-adjusting layer 16, a protective layer 18 which functions as an outermost layer of the roll is laminated with a suitable thickness. Referring to FIG. 2, there is shown another embodiment of the charging roll in which the electrically conductive and soft base layer 12 is formed of an electrically conductive foamed body.

Described more specifically, the electrically conductive and soft base layer 12 of the present semi-conductive roll is formed by any known electrically conductive elastic materials or any known electrically conductive foamable materials, so that the soft base layer 12 to be obtained has a hardness adjusted to as low as 30° (Hs: JIS-A hardness, JIS: Japanese Industrial Standard) for giving the semi-conductive roll low hardness or high softness. As the elastic material used for providing the electrically conductive elastic body as described above, any known rubber materials such as EPDM, SBR, NR and polynorbornene rubber are used. The foamable material used for providing the electrically conductive foamed body is not particularly limited, but may be suitably selected from among any known foamable materials which give a foamed rubber or a foamed resin, as long as the foamable materials prevent fatigue of the obtained foamed body, and the obtained foamed body satisfies the characteristics required for the semi-conductive roll as the charging roll. Examples of the foamable material are epichlorohydrin rubber, NBR, polyurethane rubber, hydrogenated NBR, and EPDM. The foamable material is foamed by using a known foaming agent such as azodicarbonamide, 4,4-oxybisbenzene-sulfonyl hydrazide, dinitroso pentamethylene tetramine or $NaHCO_3$. To the elastic material or the foamable material as described above, there is added an electrically conductive material such as carbon black, metal powder or quaternary ammonium salt, so that the obtained soft base layer 12 has a desired volume resistivity value. When the soft base layer 12 is formed by using the elastic material, a relatively large amount of a softener such as a process oil or a liquid polymer is further added to the elastic material in an attempt to give the soft base layer 12 low hardness or high softness.

When the electrically conductive and soft base layer 12 is formed of the electrically conductive elastic body as described above, the obtained soft base layer 12 has a volume resistivity of $10^1$–$10^4$ Ω·cm, and a thickness of generally 1–10 mm, preferably 2–4 mm. When the electrically conductive soft base layer 12 is formed of the electrically conductive foamed body, the obtained soft base layer 12 has a volume resistivity of $10^3$–$10^6$ Ω·cm, and a thickness of generally 2–10 mm, preferably 3–6 mm.

The softener-preventive layer 14 disposed on the outer circumferential surface of the soft base layer 12 as shown in FIG. 1 is formed of a material similar to a conventionally used material for forming the softener-preventive layer. For instance, the softener-preventive layer 14 is formed of a mixture of a nylon material such as N-methoxymethylated nylon and the electrically conductive material such as carbon black or metal powder. The softener-preventive layer 14 made of the mixture prepared as described above has a volume resistivity of $10^1$–$10^5$ Ω·cm, preferably about $10^3$ Ω·cm, and a thickness of generally 3–20 μm, preferably 4–10 μm.

The resistance-adjusting layer 16 is formed of a material similar to a conventionally used material for forming the resistance-adjusting layer. For instance, the resistance-adjusting layer 16 is formed of a mixture comprising a rubber material such as NBR, epichlorohydrin rubber or acrylic rubber, the electrically conductive material such as quaternary ammonium salt, and an antistatic agent. The resistance-adjusting layer 16 made of the thus prepared mixture has a volume resistivity of $10^8$–$10^{11}$ Ω·cm (when the soft base layer 12 is formed of the electrically conductive elastic body), or $10^5$–$10^9$ Ω·cm (when the soft base layer 12 is formed of the electrically conductive foamed body), and a thickness of 50–300 μm. The thus formed resistance-adjusting layer 16 controls the electric resistance of the semi-conductive roll in the form of the charging roll, to thereby improve the dielectric breakdown resistance (and consequent current leakage) of the charging roll.

The semi-conductive roll in the form of the charging roll as shown in FIGS. 1 and 2 has a protective By layer 18 with a suitable thickness which functions as the outermost layer of the roll. In the present invention, the protective layer 18 is formed by using a resin composition which includes a fluorine-modified or fluorinated acrylate resin as an essential base resin material. The use of the predetermined resin in forming the protective layer 18 effectively eliminates the conventionally experienced problem of deterioration of the reproduced image due to the adhesion of the toner to the roll surface.

As disclosed in JP-A-7-228820, the fluorine-modified acrylate resin which is used as the essential base resin material for forming the protective layer 18 of the present semi-conductive roll is a fluorine-modified acrylate resin, namely, a fluorine-modified acrylic resin, wherein a fluorinated organic group such as a perfluoroalkyl group having 1–20 carbon atoms or a partially fluorinated alkyl group having 1–20 carbon atoms is introduced into a polymer main chain of an acrylic resin as a polymer side chain with or without a suitable organic connecting or coupling group being interposed between the polymer main chain of the acrylic resin and the fluorinated organic group. Such a fluorine-modified acrylate resin is a copolymer obtained by polymerization of at least one fluorinated acrylate or methacrylate and at least one other acrylate or methacrylate, i.e., at least one fluorine-unmodified acrylate or methacrylate. Examples of the fluorinated acrylate or methacrylate are perfluoroalkyl esters or partially fluorinated alkyl esters of the acrylic acid or the methacrylic acid, and esters of the acrylic acid or the methacrylic acid wherein the fluorinated alkyl group as described above is connected to the polymer main chain of the acrylic resin via the organic connecting group. The polymer of the fluorine-modified acrylate resin may be copolymerized with a relatively small amount of polysiloxane-containing acrylate or methacrylate, as needed. The fluorine-modified acrylate resin exhibits further enhanced capability to prevent the toner or other stains from adhering to the surface of the protective layer 18 owing to copolymerization of the polysiloxane-containing acrylate or methacrylate.

In the present invention, the fluorine-modified acrylate resin as described above may be used in combination with other resin material. In particular, at least one of a fluorinated olefin resin and a fluorine-unmodified or non-fluorinated acrylate resin is preferably used in combination with the fluorine-modified acrylate resin, so as to provide a two-component base resin material or a three-component base resin material for forming the protective layer 18 of the present semi-conductive roll 18. The use of the fluorinated olefin resin with the fluorine-modified acrylate resin permits easy removal of the toner from the surface of the protective layer 18 even if the toner adheres thereto, while the use of the fluorine-unmodified acrylate resin with the fluorine-modified acrylate resin effectively increases adhesiveness of the protective layer 18 to the resistance-adjusting layer 16. Further, if both of the fluorinated olefin resin and the fluorine-unmodified acrylate resin are used in combination with the fluorine-modified acrylate resin, the protective layer 18 formed of such a resin composition is capable of exhibiting excellent characteristics owing to a synergetic effect provided by the components as the base resin material.

The fluorinated olefin resin used in combination with the fluorine-modified acrylate resin is obtained by polymerization or copolymerization of a fluorinated olefin monomer such as tetrafluoroethylene, vinylidene fluoride, hexafluoropropylene or fluorinated vinyl ether. Examples of the fluorinated olefin resin are poly(vinylidene fluoride), a copolymer of vinylidene fluoride and tetrafluoroethylene, a terpolymer of vinylidene fluoride, tetrafluoroethylene and hexafluoropropylene, a copolymer of tetrafluoroethylene and hexafluoropropylene, and a copolymer of vinylidene fluoride and hexafluoropropylene.

The fluorine-unmodified acrylate resin used in combination with the fluorine-modified acrylate resin is obtained by polymerization of at least one fluorine-unmodified or non-fluorinated acrylate monomer, and is so-called acrylic resin. Described more specifically, the fluorine-unmodified acrylate resin is a homopolymer or a copolymer of acrylate monomer or monomers. For instance, such an acrylate monomer includes: alkyl esters such as methyl, ethyl, butyl, octyl or dodecyl of the acrylic acid or the methacrylic acid; hydroxyalkyl esters such as hydroxyethyl or hydroxybutyl of the acrylic acid or the methacrylic acid; and glycidyl esters of the acrylic acid or the methacrylic acid. It is particularly preferable to use a homopolymer of methyl methacrylate or a copolymer which contains methyl methacrylate as a major component.

The fluorine-unmodified acrylate resin used in the present invention may have a plurality of hydroxyl groups in its polymer (molecular) chain. The hydroxyl groups may be introduced into the fluorine-unmodified acrylate resin by any known methods. For instance, the fluorine-unmodified acrylate resin in which the hydroxyl groups are bonded is obtained by polymerization of the acrylate monomer having the hydroxyl groups such as the hydroxyalkyl esters of the acrylic acid or the methacrylic acid as described above. The hydroxyl groups may be introduced into the fluorine-unmodified acrylate resin by reaction of reactive groups in the polymer chain of the fluorine-unmodified acrylate resin with a suitable compound having the hydroxyl groups. The hydroxyl groups may be introduced into the fluorine-unmodified acrylate resin by other methods. For instance, a monomer in which the hydroxyl groups are blocked is polymerized, and the blocking of the hydroxyl groups is released after the polymerization. Further; the hydroxyl groups may be formed by a suitable treatment after polymerization of a monomer which is capable of forming the hydroxyl groups.

The fluorinated olefin resin is used in combination with the fluorine-modified acrylate resin in an amount of 5–95 wt. %, preferably in an amount of 20–50 wt. %, while the fluorine-unmodified acrylate resin is used in combination with the fluorine-modified acrylate resin in an amount of 30–95 wt. %, preferably in an amount of 35–65 wt. %. When the base resin material of the resin composition for forming the protective layer 18 consists of the above-described three resins, i.e., the fluorine-modified acrylate resin, the fluorinated olefin resin, and the fluorine-unmodified acrylate resin (which may or may not have the hydroxyl groups), the amounts of the three resins are held within the respective ranges of 0.5–15 wt. %, 15–85 wt. %, and 10–75 wt. %, so that a total content of the three resins is adjusted to 100 wt. %.

When the base resin material of the resin composition for forming the protective layer 18 consists of the three resins, i.e., the fluorine-modified acrylate resin, the fluorinated olefin resin, and the fluorine-unmodified acrylate resin which has the hydroxyl groups, a known crosslinking agent which reacts with the hydroxyl groups is added to the resin composition so as to introduce cross-linked structure into the fluorine-unmodified acrylate resin by utilizing the hydroxyl groups bonded thereto. As the crosslinking agent, it is preferable to employ a known polyisocyanate compound having at least two functional groups. Such a polyisocyanate compound may include 2,4- and 2,6- tolylene diisocyanate (TDI), orthotoluidine diisocyanate (TODI), naphthylene diisocyanate (NDI), xylene diisocyanate (XDI), 4,4'-diphenylmethane diisocyanate (MDI), trimethylolpropane adduct of hexamethylene diisocyanate, MDI modified by carbodiimide, polymethylene polyphenylisocyanate, polymeric polyisocyanate, and the like. Any one of, or any combination of the polyisocyanate compound may be used in the present invention. For effectively introducing the cross-linked structure in the fluorine-unmodified acrylate resin, the polyisocyanate compound as the crosslinking agent is included in the resin composition in an amount not smaller than an equivalent amount of the content of the hydroxyl groups in the fluorine-modified acrylate resin, preferably in an amount not smaller than a two-fold equivalent amount of the content of the hydroxyl groups, more preferably in an amount not smaller than a three-fold equivalent amount of the content of the hydroxyl groups. In general, the upper limit of the amount of the isocyanate compound as the crosslinking agent is about fifteen-hold equivalent amount of the content of the hydroxyl groups.

The protective layer 18 is formed of the resin composition which contains as the base resin material the fluorine-modified acrylate resin which may be used in combination with the fluorinated olefin resin and/or the fluorine-unmodified acrylate resin (which may or may not have the hydroxyl groups). While the thickness of the thus formed protective layer 18 is suitably determined depending upon the specific utility or application of the roll, it is generally held in a range of 1–50 μm, preferably in a range of 3–10 μm. It is preferable that the protective layer 18 have a volume resistivity of $10^6$–$10^{15}$ Ω·cm for permitting the roll to exhibit a sufficient degree of charging characteristic. To this end, various known electrically conductive agents may be added as needed to the resin composition for the protective layer 18. Examples of the electrically conductive agent include an electron-conductive agent such as carbon black, graphite, metal powder or electrically conductive titanium oxide, and an ion-conductive agent such as polyvalent metal salt or quaternary ammonium salt.

When the protective layer 18 is formed by using the resin composition which contains as the base resin material the fluorine-modified acrylate resin, the fluorinated olefin resin, and the fluorine-unmodified acrylate resin having a plurality of hydroxyl groups therein, a suitably selected crosslinking agent is added to the resin composition for reaction with the hydroxyl groups in the fluorine-unmodified acrylate resin, so as to introduce the cross-linked structure as described above in detail. The reaction with the crosslinking agent and the hydroxyl groups in the fluorine-unmodified acrylate resin is effected by heating the roll at a suitable timing after the protective layer 18 is formed, to thereby introduce effective cross-linked structure in the polymer of the fluorine-unmodified acrylate resin. This arrangement effectively improves adhesiveness between the protective layer 18 and the resistance-adjusting layer 16 on which the protective layer 18 is formed, so as to prevent separation of the protective layer 18 from the resistance-adjusting layer 16 and cracking of the protective layer 18. While the condition of the heat-treatment for introducing the cross-linked structure in the fluorine-unmodified acrylate resin is suitably determined depending upon the amount of the hydroxyl groups in the fluorine-unmodified acrylate resin and the kind of crosslinking agent, the heat-treatment is effected generally at a temperature of 120–150° C. for 5–30 minutes.

There will be hereinafter described a manner of producing the semi-conductive roll in the form of the charging roll as shown in FIGS. 1 and 2. Initially, the soft base layer 12 which is formed of the electrically conductive elastic body or the elastically conductive foamed body as described above is formed on the outer circumferential surface of the center shaft 10 by a known method, such as molding using a metal mold. On the outer circumferential surface of the thus formed soft base layer 12, the softener-preventive layer 14, the resistance-adjusting layer 16 and the protective layer 18 are laminated in the order of description with respective thickness values by a known coating method such as dipping. Thus, an intended semi-conductive roll is obtained.

In the semi-conductive roll (charging roll) according to the present invention wherein the soft base layer 12, the softener-preventive layer 14, the resistance-adjusting layer 16, and the protective layer 18 are formed on the outer circumferential surface of the center shaft 10 in the order of description, the soft base layer 12 exhibits low hardness (high softness) and high electrical conductivity, the softener-preventive layer 14 effectively prevents the bleeding of the softener such as oil from the soft base layer 12, and the resistance-adjusting layer 16 exhibits high dielectric breakdown resistance (and consequent current leakage). In addition, since the protective layer 18 is formed by using the resin composition which contains as the base resin material the fluorine-modified acrylate resin, the outer surface of the protective layer, i.e., the outer surface of the roll is free from the adhesion or clinging of the toner. When the fluorinated olefin resin is also included in the resin composition as the base resin material, various stains deposited on the roll surface can be easily wiped away therefrom owing to the property of the fluorinated olefin resin to prevent permeation of the stains through the protective layer 18 into the roll structure. Accordingly, even if the toner adheres to the roll surface, it can be easily removed therefrom so that the roll surface is always kept clean. Further, the inclusion of the fluorine-unmodified acrylate resin in the resin composition as the base resin material advantageously improves the adhesiveness between the protective layer 18 and the resistance-adjusting layer 16, to thereby assure enhanced durability of the roll.

Examples

There will be described in detail some examples of the present invention. However, it is to be understood that the present invention is by no means limited to the details of the description of these examples, but may be embodied with various changes, modifications and improvements, which may occur to those skilled in the art, without departing from the scope of the invention as defined in the attached claims.

Preparation of Test Rolls

There were prepared respective materials for providing a soft base layer (12) formed of an electrically conductive elastic body, a softener-preventive layer (14), and a resistance-adjusting layer (16), so as to have the respective compositions as indicated below. Each of the material for the softener-preventive layer and the material for the resistance-adjusting layer was dissolved in methyl ethyl ketone so as to provide a coating liquid having a suitable viscosity value.

<Composition of the Material for the Soft Base Layer (12)>

| | |
|---|---|
| Polynorbornene rubber | 100 parts by weight |
| Ketjen black | 50 parts by weight |
| naphthenic oil | 400 parts by weight |

<Composition of the Material for the Softener-preventive Layer (14)>

| | |
|---|---|
| N-methoxymethylated nylon | 100 parts by weight |
| carbon black | 15 parts by weight |

<Composition of the Material for the Resistance-adjusting Layer (16)>

| | |
|---|---|
| epichlorohydrin rubber | 100 parts by weight |
| quaternary ammonium salt (tetramethyl ammonium perchlorate) | 1 part by weight |

By using the respective materials as described above, a 3.5 mm-thick soft base layer 12 was initially formed on an outer circumferential surface of a metal core having a diameter of 8 mm by molding using a metal mold. Subsequently, a 8 μm-thick softener-preventive layer 14 and a 100 μm-thick resistance-adjusting layer 16 were formed on the soft base layer 12 by a known dipping method. In this manner, the test rolls were obtained.

EXAMPLE I

Roll specimens Nos. 1–11 according to the present invention and roll specimens Nos. 1–4 as Comparative examples Initially, there were prepared various coating liquids each of which provides the protective layer (18) on the test roll prepared as described above. The coating liquids were prepared from various resin materials having the respective compositions as indicated in the following TABLE 1 wherein a fluorine-modified acrylate resin (referred to as "Component A"), a fluorinated olefin resin (referred to as "Component B"), and a fluorine-unmodified acrylate resin (referred to as "Component C") are used in various combinations in different amounts as indicated in the TABLE 1. The resin materials further include as needed 100 parts by weight of an electrically conductive titanium oxide as a filler. Each of the materials was dissolved in methyl ethyl ketone, so as to provide the corresponding coating liquid for the protective layer (18). In this Example, as the fluorine-modified acrylate resin (Component A), a copolymer was used which contains as a major constituent partially fluorinated alkyl ester of an acrylic acid and methyl methacrylate. As the fluorinated olefin (Component B), a copolymer of vinylidene fluoride and tetrafluoroethylene was used, while a polymethyl methacrylate was used as the fluorine-unmodified acrylate resin (Component C).

As comparative examples, there were prepared various coating liquids for providing different protective layers by using various resin materials as indicated in the following TABLE 2. Described more specifically, in the comparative examples, there were prepared four kinds of resin materials for the coating liquids which include only the fluorinated olefin resin (No. 1), only the fluorine-unmodified acrylate resin (No. 3), a combination of the fluorinated olefin resin and the fluorine-unmodified acrylate resin (No. 2), and the conventionally used N-methoxymethylated nylon (No. 4), respectively. Each of these materials was dissolved in methyl ethyl ketone so as to provide the corresponding coating liquid. To the material which contains the N-methoxymethylated nylon, there was added a mixture of a carbon black and a metal oxide as the filler. To other materials, the electrically conductive titanium oxide was added as the filler.

By using the thus prepared various coating liquids, the protective layers 18 having different thickness values as also indicated in the TABLES 1 and 2 were formed on the outer surfaces of the resistance-adjusting layers 16 of the respective test rolls, so as to provide semi-conductive roll specimens Nos. 1–11 according to the present invention and semi-conductive roll specimen Nos. 1–4 as the comparative examples.

Each of the thus obtained specimen rolls was evaluated in terms of the electric resistance, the degree of toner adhesion, and the image quality in the following manner.

For each of the specimen rolls, there were measured an electric resistance of the protective layer and an electric resistance of the roll itself. The electric resistance of the roll is represented by an electric resistance value measured between the metal core of the roll and a 1 $cm^2$-electrode provided on the roll surface.

The degree of adhesion of the toner to the specimen rolls was evaluated in the following manner.

Initially, each of the specimen rolls was used as a charging roll in a commercially available laser beam printer ("LASER-JET 4PLUS" manufactured by JAPAN HEWLETT PACKARD Co., Ltd., Japan). Under the, environment of 23° C. and 53% RH, a suitable image was successively printed, on 1000 copy sheets. After the printing, the toner adhering to the outer surface of each roll was removed by using a tape ("SCOTCH MENDING TAPE" available from SUMITOMO 3M COMPANY, Japan).

The concentration of the toner transferred to the tape was measured by a densitometer (manufactured by X-RITE Company, U.S.A.). The concentration of the toner which adhered to the roll surface increased with an increase of the measured values.

The image quality was evaluated after printing a suitable image on 1000 copy sheets, and on 5000 copy sheets, under the environment of 15° C. and 10% RH while each of the specimen rolls was used as the charging roll in the laser beam printer as described above. In the following TABLES, "○" indicates that the reproduced image did not suffer from quality deterioration and "x" indicates that the reproduced image suffered from the quality deterioration so that the roll is not practically acceptable.

The quality of each of the specimen rolls was generally evaluated. In the TABLES, "○" indicates that the specimen roll exhibits excellent quality, "Δ" indicates that the specimen roll is inferior in quality but tolerable for practical use, and "x" indicates that the specimen roll is not satisfactory for practical use.

TABLE 1

| | | | Present invention | | | | | | | | | |
|---|---|---|---|---|---|---|---|---|---|---|---|---|
| | | 1 | 2 | 3 | 4 | 5 | 6 | 7 | 8 | 9 | 10 | 11 |
| Protective layer | Component A‡ | 100 | 100 | 50 | 35 | 20 | 1 | 10 | 10 | 10 | 35 | 65 |
| | Component B‡ | — | — | 50 | 65 | 80 | 84 | 40 | 40 | 20 | — | — |
| | Component C‡ | — | — | — | — | — | 15 | 50 | 50 | 70 | 65 | 35 |
| | filler | — | electrically conductive titanium oxide | | | | | | — | electrically conductive titanium oxide | | |
| | thickness ($\mu m$) | 1 | 5 | 5 | 5 | 5 | 5 | 5 | 1 | 5 | 5 | 5 |
| | electric resistance ($\Omega$) | $2.0 \times 10^{11}$ | $7.0 \times 10^{7}$ | $8.0 \times 10^{7}$ | $6.9 \times 10^{7}$ | $7.4 \times 10^{7}$ | $8.3 \times 10^{7}$ | $8.0 \times 10^{7}$ | $4.0 \times 10^{11}$ | $7.2 \times 10^{7}$ | $7.4 \times 10^{7}$ | $8.1 \times 10^{7}$ |
| electric resistance of the roll ($\Omega$) | | $4.6 \times 10^{7}$ | $3.6 \times 10^{6}$ | $2.0 \times 10^{6}$ | $4.0 \times 10^{6}$ | $3.0 \times 10^{6}$ | $3.4 \times 10^{6}$ | $2.4 \times 10^{6}$ | $3.0 \times 10^{7}$ | $2.8 \times 10^{6}$ | $3.0 \times 10^{6}$ | $3.0 \times 10^{6}$ |
| toner concentration adhered to the roll surface | | 0.30 | 0.31 | 0.33 | 0.35 | 0.42 | 0.35 | 0.32 | 0.33 | 0.33 | 0.40 | 0.35 |
| image quality | after 1000-sheet printing | ○ | ○ | ○ | ○ | ○ | ○ | ○ | ○ | ○ | ○ | ○ |
| | after 5000-sheet printing | ○ | ○ | ○ | ○ | ○ | ○ | ○ | ○ | ○ | ○ | ○ |
| evaluation of the roll | | ○ | ○ | ○ | ○ | ○ | ○ | ○ | ○ | ○ | ○ | ○ |

‡parts by weight
Component A: fluorine-modified acrylate resin
Component B: fluorinated olefin resin
Component C: fluorine-unmodified acrylate resin

TABLE 2

| | | Comparative examples | | | |
|---|---|---|---|---|---|
| | | 1 | 2 | 3 | 4 |
| protective layer | Component A‡ | — | — | — | N-methoxymethylated nylon |
| | Component B‡ | 100 | 50 | — | |
| | Component C‡ | | 50 | 100 | |
| | filler | electrically conductive titanium oxide | | | carbon black and metal oxide |
| | thickness ($\mu m$) | 5 | 5 | 5 | 5 |
| | electric resistance ($\Omega$) | $7.2 \times 10^{7}$ | $7.4 \times 10^{7}$ | $7.0 \times 10^{7}$ | $9.0 \times 10^{7}$ |
| electric resistance of the roll ($\Omega$) | | $3.0 \times 10^{6}$ | $2.9 \times 10^{6}$ | $3.4 \times 10^{6}$ | $4.0 \times 10^{6}$ |
| toner concentration adhered to the roll surface | | 0.62 | 0.64 | 0.64 | 0.74 |

TABLE 2-continued

| | | Comparative examples | | | |
|---|---|---|---|---|---|
| | | 1 | 2 | 3 | 4 |
| image quality | after 1000-sheet printing | ○ | ○ | ○ | X |
| | after 5000-sheet printing | X | X | X | X |
| evaluation of the roll | | Δ | Δ | Δ | X |

‡parts by weight
Component A: fluorine-modified acrylate resin
Component B: fluorinated olefin resin
Component C: fluorine-unmodified acylate resin As is apparent from the results as indicated in the above TABLES 1 and 2, the degree of adhesion of the toner was low in the specimen rolls Nos. 1–11 according to the present invention, so that the quality of the reproduced image was high over a long period of use of the present charging rolls. On the contrary, in the specimen rolls Nos. 1–3 as the comparative examples wherein the resin composition for providing the protective layer does not include the fluorine-modified acrylate resin as the base resin material, i.e., the resin composition for the protective layer includes as the base resin material only the fluorinated olefin resin and/or the fluorine-unmodified acrylate resin, the degree of adhesion of the toner to the roll surface was high, and the quality of the reproduced image was deteriorated with an increase in the number of printing operations. It is further understood that the specimen roll No. 4 in the comparative example wherein the protective layer is formed of the conventionally used N-methoxymethylated nylon was suffered from a considerably high degree of adhesion of the toner, whereby the quality of the reproduced image was considerably deteriorated.

EXAMPLE II

Roll specimens Nos. 12–18 according to the present invention and roll specimens Nos. 5–6 as Comparative examples Initially, there were prepared test rolls in the same manner as in the above EXAMPLE I. Then, various coating liquids for providing different protective layers (18) were prepared by using various resin compositions. The resin compositions include as the base resin material the fluorine-modified acrylate resin (referred to as "Component A"), the fluorinated olefin resin (referred to as "Component B"), and the fluorine-unmodified acrylate resin having different hydroxyl values, i.e., having different amounts of the hydroxyl groups (referred to as "Components C1–C4") in various combinations and in different amounts as indicated in the following TABLE 3. Each of the resin compositions includes as a crosslinking agent a trimethylolpropane adduct of hexamethylene diisocyanate in an amount so as to have the corresponding equivalent ratio of NCO/OH as also indicated in the TABLE 3. After the electrically conductive titanium oxide was added to the resin compositions as needed, the resin compositions were dissolved in the methyl ethyl ketone, to thereby provide the various coating liquids for providing the different protective layers (18). In this EXAMPLE II, as the fluorine-modified acrylate resin (Component A), a copolymer which contains as a major constituent partially fluorinated alkyl ester of an acrylic acid and methyl methacrylate was used, while a copolymer of vinylidene fluoride and tetrafluoroethylene was used as the fluorinated olefin resin (Component B). As the fluorine-unmodified acrylate resin (Components C1–C4), various methyl methacrylate resins having different copolymerization ratios of hydroxyethyl methacrylate, i.e., having different hydroxyl values were employed.

By using each of the thus prepared coating liquids, the protective layer 18 was formed on the outer surface of the resistance-adjusting layer 16 of the corresponding test roll prepared as described above. The obtained roll was subjected to a heat treatment at 130° C. for 15 minutes to introduce a cross-linked structure in the fluorine-unmodified acrylate resin, whereby an intended semi-conductive roll specimen was obtained.

Similarly, there were prepared specimen rolls Nos. 5 and 6 as comparative examples wherein the protective layers were formed by using respective resin compositions as indicated in the TABLE 3, each of which does not have the cross-linked structure in the fluorine-unmodified acrylate resin.

Each of the thus obtained specimen rolls was evaluated in terms of the toner adhesion, and the image quality in the following manner.

The degree of adhesion of the toner to the specimen rolls was evaluated as follows. Initially, each of the specimen rolls was used as a charging roll in a commercially available laser beam printer ("LASER-JET 4-PLUS" manufactured by JAPAN HEWLETT PACKARD Co., Ltd., Japan). Under the environment of 23° C. and 53% RH, a suitable image was successively printed on 1000 copy sheets. After the printing, the toner adhering to the outer surface of each roll was removed by using a tape ("SCOTCH MENDING TAPE" available from SUMITOMO 3M COMPANY, Japan). The concentration of the toner transferred to the tape was measured by a densitometer (manufactured by X-RITE Company, U.S.A.). The measured value smaller than 0.5 indicates that the concentration of the toner which adhered to the roll surface is low, and therefore the specimen rolls with the toner concentration smaller than 0.5 did not suffer from adhesion of the toner to their surfaces. These specimen rolls are evaluated as "○" in the TABLE 3.

The image quality was evaluated after printing a suitable image on 1000 copy sheets, 5000 copy sheets, and 10000 copy sheets, under the environment of 15° C. and 10% RH while each of the specimen rolls was used as the charging roll in the laser beam printer as described above. In the following TABLE 3, "○" indicates that the reproduced image did not suffer from quality deterioration, "Δ" indicates that the reproduced image is tolerable for practical use, and "x" indicates that the reproduced image suffered from the quality deterioration due to surface cracking of the roll, failing to assure satisfactory quality suitable for practical use. The results of evaluation are also indicated in TABLE 3.

TABLE 3

| | | Present invention | | | | | | | Comparative examples | |
|---|---|---|---|---|---|---|---|---|---|---|
| | | 12 | 13 | 14 | 15 | 16 | 17 | 18 | 5 | 6 |
| Composition of the protective layer* | Component A | 10 | 10 | 10 | 10 | 10 | 10 | 10 | 10 | 10 |
| | Component B | 40 | 40 | 40 | 40 | 40 | 40 | 40 | 40 | 40 |
| | Component C1 | — | — | — | — | — | — | — | 50 | — |
| | Component C2 | 50 | — | — | — | — | — | — | — | — |
| | Component C3 | — | 50 | 50 | 50 | 50 | — | 50 | — | 50 |
| | Component C4 | — | — | — | — | — | 50 | — | — | — |
| hydroxyl values in the composition of the protective layer | | 0.3 | 0.5 | 0.5 | 0.5 | 0.5 | 1 | 0.5 | 0 | 0.5 |
| inclusion of the crosslinking agent | | YES | YES | YES | YES | YES | YES | YES | NO | NO |
| equivalent NCO/OH ratio | | 5 | 3 | 5 | 10 | 15 | 5 | 1 | — | — |
| toner concentration adhered to the roll surface | | ○ | ○ | ○ | ○ | ○ | ○ | ○ | ○ | ○ |
| image quality | after 1000-sheet printing | ○ | ○ | ○ | ○ | ○ | ○ | ○ | ○ | ○ |
| | after 50000-sheet printing | ○ | ○ | ○ | ○ | ○ | ○ | ○ | ○ | ○ |
| | after 10000-sheet printing | ○ | ○ | ○ | ○ | ○ | ○ | × | × | × |

*parts by weight
Component A: fluorine-modified acrylate resin
Component B: fluorinated olefin resin
Component C: C1–C4: fluorine-unmodified acrylate resin (wherein the Component C1 has the hydroxyl value of 0, the Component C2 has the hydroxyl value of 0.6, the Component C3 has the hydroxyl value of 1, and the Component C4 has the hydroxyl value of 2.)

Component A: fluorine-modified acrylate resin

Component B: fluorinated olefin resin

Components C1–C4: fluorine-unmodified acrylate resin (wherein the Component C1 has the hydroxyl value of 0, the Component C2 has the hydroxyl value of 0.6, the Component C3 has the hydroxyl value of 1, and the Component C4 has the hydroxyl value of 2.)

As is apparent from the results as indicated in the above TABLE 3, in the specimen rolls Nos. 12–18 according to the present invention, the degree of adhesion of the toner to the roll surface was low, and the reproduced image showed significantly high quality since these specimen rolls did not suffer from cracking on their surfaces owing to the introduction of the cross-linked structure into the fluorine-unmodified acrylate resin as the base resin material in the resin composition for the protective layer. In contrast, the specimen rolls Nos. 5 and 6 according to the comparative examples wherein the cross-linked structure was not introduced into the fluorine-unmodified acrylate resin suffered from the cracking on the outer surfaces thereof, so that the reproduced image had deteriorated quality unsuitable for practical use.

In the semi-conductive roll constructed according to the present invention, since the outermost layer thereof which is held in contact with the photosensitive drum is formed by using the resin composition which includes the fluorine-modified acrylate resin as the base resin material, the adhesion of the toner to the roll surface is effectively prevented or reduced owing to the fluorine-modified acrylate resin. This arrangement effectively prevents deterioration of the quality of the reproduced image, and significantly improves the durability of the apparatus which includes the semi-conductive roll according to the present invention, in other words, the durability of the present semi-conductive roll. The fluorinated olefin resin used in combination with the fluorine-modified acrylate resin prevents various stains from permeating through the outermost layer into the roll structure. In this arrangement, even if the toner adheres to the roll surface, it can be easily removed therefrom, so that the roll surface can be kept clean. Further, when the fluorine-unmodified acrylate resin having a plurality of hydroxyl groups is included as the base resin material in the resin composition for the outermost layer, and the hydroxyl groups are reacted with a suitable crosslinking agent so as to introduce an effective cross-linked structure in the fluorine-unmodified acrylate resin, the outermost layer can be bonded to the underlying layer of the roll structure with high stability. This arrangement effectively avoids or reduces the separation of the outermost layer from the roll structure and cracking on the roll surface, leading to significantly enhanced durability of the semi-conductive roll.

What is claimed is:

1. A method of preventing adhesion of toner to an outermost layer of an electrically semi-conductive roll which is held in rolling contact with an outer circumferential surface of a photosensitive drum, comprising forming said outermost layer using a resin composition which contains as a base resin material a fluorine-modified acrylate resin.

2. The method of claim 1, wherein said resin composition further contains as said base resin material at least one of a fluorinated olefin resin and a fluorine-unmodified acrylate resin.

3. The method of claim 2, wherein said base resin material consists of said fluorine-modified acrylate resin and said fluorinated olefin resin.

4. The method of claim 3, wherein a content of said fluorinated olefin resin in said base resin material is 5–95 wt %.

5. The method of claim 2, wherein said base resin material consists of said fluorine-modified acrylate resin and said fluorine-unmodified acrylate resin.

6. The method of claim 5, wherein a content of said fluorine-unmodified acrylate resin in said base resin material is 30–95 wt %.

7. The method of claim 2, wherein said base resin consists of said fluorine-modified acrylate resin, said fluorinated olefin, and said fluorine-unmodified acrylate resin.

8. The method of claim 7, wherein said fluorine-unmodified acrylate resin has a plurality of hydroxyl groups, and said fluorine-unmodified acrylate resin is crosslinked by a crosslinking agent which reacts with said plurality of hydroxyl groups.

9. The method of claim 8, wherein said crosslinking agent is a polyisocyanate compound.

10. The method of claim 8, wherein said fluorine-unmodified acrylate resin is crosslinked by said crosslinking agent by heating at a temperature of 120–150° C. for 5–30 minutes.

11. The method of claim 7, wherein contents of said fluorine-modified acrylate resin, said fluorinated olefin resin, and said fluorine-unmodified acrylate resin in said base resin material are 0.5–15 wt %, 15–85 wt %, and 10–75 wt %, respectively.

12. The method of claim 1, wherein said fluorine-modified acrylate resin is a copolymer obtained by polyrnerization of at least one fluorine-modified acrylate or methacrylate and at least one fluorine-unmodified acrylate or methacrylate.

13. The method of claim 2, wherein said fluorinated olefin resin is selected from the group consisting of poly (vinylidene fluoride); a copolymer of vinylidene fluoride and tetrafluoroethylene; a terpolymer of vinylidene fluoride, tetrafluoroethylene, and hexafluoropropylene; a copolymer of tetrafluoroethylene and hexafluoropropylene; and a copolymer of vinylidene fluoride and hexafluoropropylene.

14. The method of claim 2, wherein said fluorine-unmodified acrylate resin is selected from the group consisting of a homopolymer of methyl methacrylate and a copolymer which contains methyl methacrylate as a major component.

15. The method of claim 1, wherein said electrically semi-conductive roll comprises a center shaft, an electrically conductive base layer located radially outwardly of said center shaft and formed of an elastic body or a foamed body, a resistance-adjusting layer located radially outwardly of said electrically conductive base layer, and a protective layer located radially outwardly of said resistance-adjusting layer and which functions as said outermost layer.

16. The method of claim 15, further including a softener-preventive layer located between said electrically conductive base layer and said resistance-adjusting layer.

17. The method of claim 1, wherein said outermost layer has a volume resistivity of $10^{6}$–$10^{15}$ Ω·cm.

* * * * *